United States Patent [19]

Loughlin et al.

[11] Patent Number: 4,878,388

[45] Date of Patent: Nov. 7, 1989

[54] METHOD FOR SIMULATING AND DEMONSTRATING THE GAS EXCHANGE DURING MANDATORY OR ASSISTED VENTILATION AND APPARATUS THEREFOR

[75] Inventors: Patrick J. Loughlin; Dwayne R. Westenskow, both of Salt Lake City, Utah; Henrich A. Wied, Bad Schwartau; Carl-Friedrich Wallroth, Lübeck, both of Fed. Rep. of Germany

[73] Assignee: Drägerwerk Aktiengesellschaft, Lübeck, Fed. Rep. of Germany

[21] Appl. No.: 126,175

[22] Filed: Nov. 27, 1987

[51] Int. Cl.⁴ .......................................... G09B 23/28
[52] U.S. Cl. .............................. 73/866.4; 128/200.11; 434/262; 434/265
[58] Field of Search ...................... 128/200.11, 202.21, 128/910, DIG. 13, 203.25, 204.14, 205.11, 205.12, 205.28, 205.27, 203.14; 73/866.4, 1 G, 3, 865.9; 434/265, 262

[56] References Cited

U.S. PATENT DOCUMENTS

| | | | |
|---|---|---|---|
| Re. 29,317 | 7/1977 | Mosley et al. | 73/866.4 |
| 3,520,071 | 7/1970 | Abrahamson et al. | 434/265 |
| 3,566,865 | 3/1971 | Hay | 73/1 G |
| 4,127,121 | 11/1978 | Westenkow et al. | 128/203.14 |
| 4,267,721 | 5/1981 | Longenecker et al. | 73/1 G |
| 4,278,636 | 7/1981 | Voigt et al. | 73/1 G X |
| 4,407,152 | 10/1983 | Gath | 73/1 G |
| 4,516,424 | 5/1985 | Rowland | 73/1 G X |
| 4,537,058 | 8/1985 | Luper | 73/1 G |
| 4,723,435 | 2/1988 | Huszczuk | 73/1 G |
| 4,765,193 | 8/1988 | Holden et al. | 73/865.9 |
| 4,799,374 | 1/1989 | Bossort et al. | 73/1 G |

FOREIGN PATENT DOCUMENTS

| | | | |
|---|---|---|---|
| 2422271 | 1/1976 | Fed. Rep. of Germany | 73/1 G |
| 2804288 | 8/1979 | Fed. Rep. of Germany | 73/1 G |
| 3049583 | 7/1982 | Fed. Rep. of Germany | . |
| 720851 | 12/1984 | U.S.S.R. | 73/1 G |
| 1443484 | 7/1976 | United Kingdom | 73/1 G |

OTHER PUBLICATIONS

"A Device for Calibrating Electrical Humidity Sensors"; *Materials Research & Standards;* Jun. 1966; pp. 25–29; C. P. Hedlin.

English Language Abstract of German Patent Document No. 3049583, (Patent Dated 7-1982).

*Primary Examiner*—Tom Noland
*Attorney, Agent, or Firm*—Walter Ottesen

[57] ABSTRACT

The invention is directed to a method for simulating and demonstrating the gas exchange during ventilation wherein the breathing gas is influenced with respect to its constituents by changing the portion of at least one breathing gas component metered to the carrier gas. The method permits simulation of physiological functions occurring during anesthesia such as the uptake and release of anesthetic agents. For this purpose, an anesthetic agent is admixed to the breathing gas and this anesthetic gas mixture is conducted through a reservoir filled with organic oil to simulate the anesthetic agent uptake and release by the human or animal body.

14 Claims, 2 Drawing Sheets

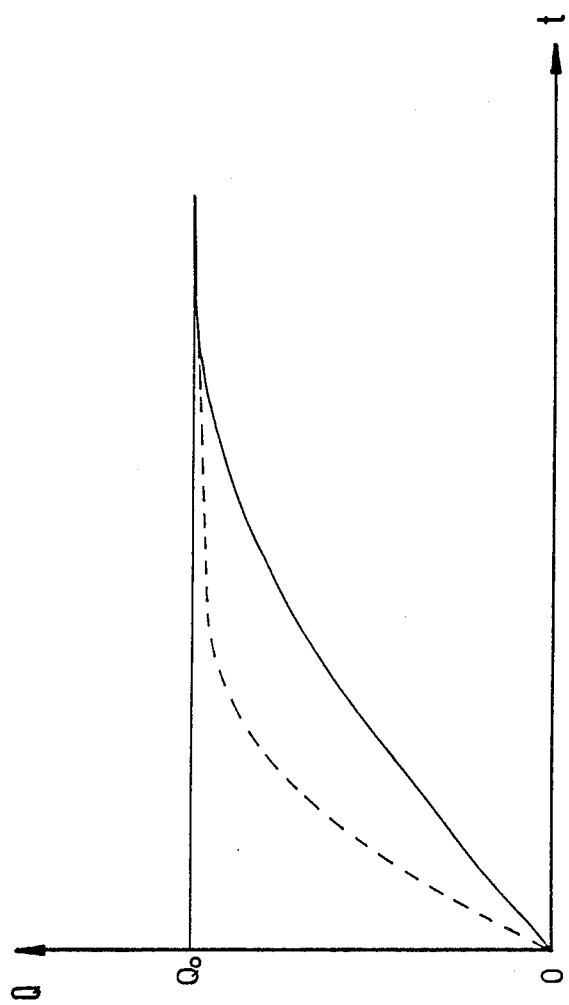

METHOD FOR SIMULATING AND DEMONSTRATING THE GAS EXCHANGE DURING MANDATORY OR ASSISTED VENTILATION AND APPARATUS THEREFOR

FIELD OF THE INVENTION

The invention relates to a method for simulating and demonstrating the exchange of gas during mandatory or assisted ventilation wherein the composition of the breathing gas is influenced by changing the portion of at least one breathing gas component to be added to the carrier gas. An apparatus for performing the method of the invention is also disclosed.

BACKGROUND OF THE INVENTION

It is necessary to evaluate the performance of respiratory apparatus with associated control and regulating loops during the development: and use of these apparatus. Furthermore, it is desirable to practice the manipulation of such apparatus and to learn the consequences of their use before they are placed into service for their intended use. For both purposes, it is desirable to avoid investigations on test persons and animals. Simulators of various kinds are described which permit the mechanical as well as the physiological functions to be simulated and demonstrated which occur during ventilation. One such simulator is disclosed in the published German Patent Application DE-OS No. 30 49 583.

The method necessary to operate the known simulator provides that a respiratory apparatus in the form of a pneumatic drive unit is provided with a breathing gas of varying composition which thereafter is conducted via a breathing circuit to an arrangement simulating the lungs. The lungs themselves are formed by means of displaceable rubber bellows which can expand against a resilient force when they are pumped full with breathing gas. In this way, the functions of the lungs such as compliance (C) or resistance (R) are imitated. Since carbon dioxide is formed in the human body during breathing, such an enrichment of carbon dioxide can be achieved by metering the carbon dioxide into the breathing circuit.

Further physiological functions such as oxygen consumption during ventilation, however, cannot be simulated. Since ventilation also must be conducted during anesthesia, the physiological effects of anesthetic gases must also be considered. No possibility of a simulation for this purpose is provided in the known arrangement.

SUMMARY OF THE INVENTION

It is an object of the invention to provide a method of the kind described above which simulates the physiological functions occurring with ventilation during anesthesia. It is another object of the invention to provide such a method which can especially simulate the uptake of the anesthetic agents and the washout thereof. It is still a further object of the invention to provide an apparatus for carrying out the embodiments of the method of the invention.

According to a feature of the invention, the anesthetic agent is mixed with the breathing gas and this anesthetic gas mixture is conducted through a reservoir filled with organic oil.

It has been shown that conventional anesthetic agents such as nitrous oxide ($N_2O$) or volatile halogenated hydrocarbons dissolve easily in an organic oil and thereby simulate the uptake of the anesthetic agent by the human or animal body. The anesthetic agent which has been dissolved in oil is washed out as soon as the concentration of anesthetic agent in the breathing gas mixture decreases.

With the invention, it is therefore possible, on the one hand, to investigate the effects of various anesthetic agents on the human body with the quantity of the oil held in the reservoir to be matched to the capacity of the analog body size of a human or animal; and, on the other hand, it is possible to test the anesthetic respiratory apparatus in that a correlation is established between the anesthetic gas concentration delivered by the anesthetic apparatus and the quantity taken up by the human or animal body. In this context, it is noted that the analog body size is that portion of the body which takes up the anesthetic agent. For example, a person weighing 80 kilograms may have adipose tissue weighing about 12 kilograms and that is 12 kilograms which constitutes the analog body size, since it is mostly fatty tissue which takes up and stores the anesthetic agent. In this way, it is possible to optimize closed loop control through monitoring the anesthetic agent concentration wherein just as much anesthetic agent is added to the breathing gas by the anesthetic respiratory apparatus as the body consumes. Kinetic investigations can also be conducted to determine what quantities of anesthetic agent are taken up and released during a particular time interval. This is especially important when the necessary time has to be determined for the induction of anesthesia or the recovery from anesthesia.

Accordingly, the method of the invention shows a simple possibility to simulate the physiological parameters needed for carrying out anesthesia and how these parameters can be evaluated for clinical practice.

As a suitable oil, every animal, vegetable or mineral oil can be utilized. Soybean oil has proved to be especially suitable because it is widely available and inexpensive.

In order to change the portion of the anesthetic agent taken up and released by the oil, the quantity of the admixed anesthetic agent can be changed or the filling level of the reservoir can be changed with the quantity of anesthetic agent remaining constant. Changes of this kind provide information concerning the kinetic behavior of anesthetic agents in the human or animal body.

It is advantageous to mount an anesthetic agent sensor in the breathing circuit in order to quantify uptake or release of the anesthetic agent.

A part of the breathing gas mixture is drawn from the main circuit to simulate oxygen consumption or carbon dioxide production during an anesthetic procedure. The remaining gas components of the anesthetic gas mixture are held constant in that the corresponding quantities are metered to the main circuit again. If it is intended to simulate only oxygen consumption, carbon dioxide and/or nitrous oxide or anesthetic gas are likewise drawn from the main circuit; however, their concentration must remain constant for the simulation of oxygen consumption. For this purpose, corresponding parts of carbon dioxide or anesthetic gas are metered to the main circuit again.

An arrangement for carrying out the method of the invention includes a pneumatic drive unit which can be, for example, in the form of a respiratory apparatus. A gas blender and supply unit for preparing the anesthetic gas mixture is connected via the respiratory apparatus to the breathing circuit. For simulating the uptake of anesthetic agent or its release, a pumping device such as a membrane pump is provided which directs the anesthetic gas mixture from the breathing circuit through at least one reservoir filled with an organic oil. According to pumping capacity, more or less anesthetic gas is pumped through the oil. Correspondingly, more or less anesthetic agent is held by the oil.

Several reservoirs may be connected in parallel in the main circuit. The amount of oil through which gas flows can be varied by the number of reservoirs.

Pursuant to a further embodiment of the invention, each of the reservoirs can be provided with its own pumping device with each one of the reservoirs containing a different amount of oil. By changing the pumping capacity and/or the filling level of oil in the reservoirs, different kinetics for anesthetic agent uptake in various body regions of a human or animal can be simulated. It is known that the anesthetic agent in a human or animal body is taken up and released differently at various locations.

It is desirable to model lung parameters such as compliance (C) and resistance (R) during the simulation. For this purpose, a U-shaped tube filled with liquid is utilized which is connected to the breathing circuit, with its chamber sealed with respect to the ambient. A supply line from the drive unit leads into the chamber. The U-shaped tube forms the parameters essential for the simulation since the chamber volume is raised with each stroke of the drive unit configured as a respiratory apparatus. In this way, a static pressure is generated which continues into the breathing circuit.

The dimensions of the U-shaped tube establish compliance and resistance. Furthermore, by connecting the chamber volume to the breathing circuit, the lung is simulated as a so-called used gas reservoir which leaves a certain functional residual capacity of a human or animal lung unused. With each expiration, a non-exhaled residual volume remains in the lung in which anesthetic agents are also present. This residual volume is continuously mixed with fresh gas by means of the circulating anesthetic gas mixture in the breathing circuit. In this way, the residual volume [functional residual capacity (FRC)] remaining in the lung after a normal expiration is modeled by this arrangement.

In order to simulate oxygen consumption or carbon dioxide production by the lung, a predetermined quantity of breathing gas mixture is drawn from the main circuit by means of a pumping unit. Since other components of the anesthetic gas mixture are released also to the ambient with the components (oxygen or carbon dioxide) to be withdrawn, these components of the anesthetic gas mixture must be added again. In this way, a fine tuning between the quantity of anesthetic gas withdrawn and the component of anesthetic gas added is possible.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
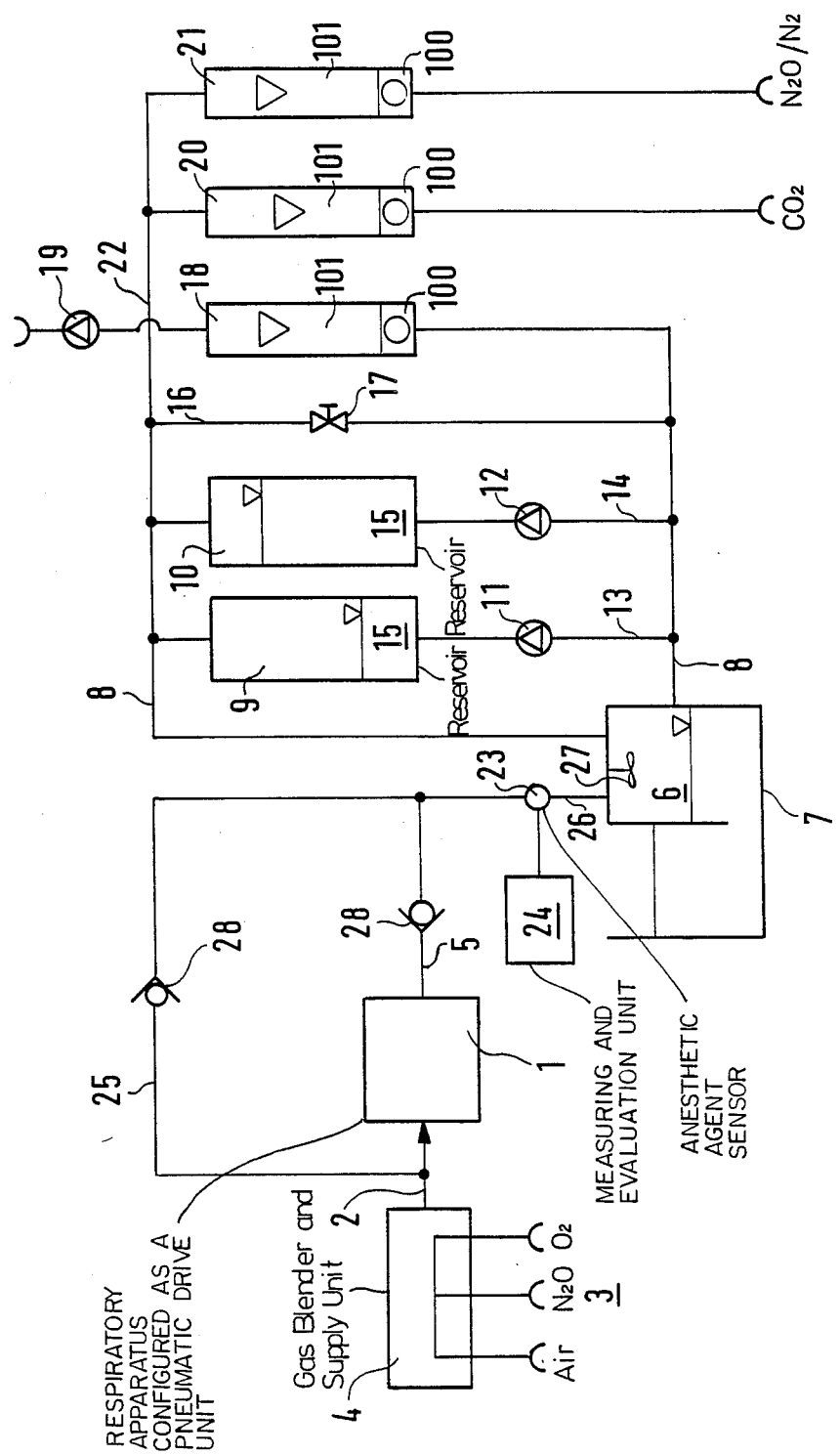
FIG. 1 shows an apparatus according to an embodiment of the invention for carrying out the method thereof; and, FIG. 2 is a graph of the amount of anesthetic agent Q as a function of time t during anesthesia.

Referring to FIG. 1, a respiratory apparatus 1 configured as a pneumatic drive unit is supplied with an anesthetic gas mixture via a supply line 2. This mixture is prepared by a blender 4 connected to the gas supply 3 which is necessary for this purpose.

The breathing circuit required during mandatory or assisted ventilation comprises the following: the supply line 2, the respiratory apparatus 1 connected to the supply line 2 as shown, the connecting gas lines (5, 26) and the feedback line 25. The gas lines (5, 26) connect the respiratory apparatus 1 with the chamber 6 of a lung-simulation unit in the form of a U-shaped tube 7 filled with liquid. The chamber 6 is sealed off with respect to the ambient. The anesthetic gas mixture which is circulated through the main circuit line 8 is mixed thoroughly by a fan 27 located in the chamber 6. The anesthetic gas mixture from the main circuit line 8 is mixed with the anesthetic gas which is newly added via the connecting line 26 during an inspiration stroke in the chamber 6. Two reservoirs (9, 10) are mounted parallel to each other and are connected into the main circuit line 8. Pumps (11, 12) located in respective gas lines (13, 14) are assigned to corresponding reservoirs (9, 10). The reservoirs (9, 10) are filled with different quantities of organic oil and can be shunted with a separate gas line 16 and an adjustable valve 17.

From the main circuit 8, a metering device 18 and a pumping device 19 connected in series with each other branch off to the ambient. With the metering device 18, the quantity of the anesthetic gas mixture ($O_2$, $N_2O$, $CO_2$, $N_2$) withdrawn is adjusted. This metered quantity is utilized to determine the amounts of gases ($CO_2$, $N_2O$, $N_2$) which must be returned via metering devices (20, 21). The two metering devices (20, 21) are arranged parallel to each other for two components of the anesthetic gas mixture and are arranged together in a supply line 22 and led into the main circuit 8.

The metering devices comprise adjustable needle valves 100 and flow-measuring tubes 101 corresponding thereto. An anesthetic agent sensor 23 together with a measuring and evaluation device 24 is located in the breathing circuit line 26. During inspiration, the anesthetic gas mixture is directed via a unidirectional valve 28 and gas lines (5, 26) from the respiratory apparatus 1 to the chamber 6; whereas during expiration, the anesthetic gas mixture is returned to the respiratory apparatus 1 via a gas line 25 and the associated unidirectional valve 28. The quantity of anesthetic gases (air, $N_2O$, $O_2$) added is adjusted with a gas supply unit 3. The connecting node 30 simulates the Y-piece interconnecting the patient and the breathing circuit.

When anesthetic gas is delivered to the main circuit 8, a part thereof or all of the amount in the circuit is transported through the initially unsaturated oil 15 contained in the reservoirs (9, 10) in dependence upon the adjustment of a valve 17. The oil 15 simulates fatty tissue in different parts of the body and will take up the anesthetic agent until it is saturated. This is shown diagrammatically in FIG. 2, in which the amount of anesthetic agent Q being stored in the oil 15 is plotted against time t. The amount $Q_0$ indicates saturation. This characteristic curve in the form of an exponential increase shows a typical course of anesthesia which is a composite of the amounts of gas absorbed by the reservoir 15.

One can easily control anesthesia gas admixture variations in order to obtain the saturation value $Q_0$ earlier (dashed line) or later (solid line) by giving a higher or lower concentration, respectively, in the beginning.

As anesthesia is completed, the curve, due to release of anesthetic agent from the oil 15 will drop from its saturation $Q_0$ down to zero in a multi-exponential manner which is a composite of the amounts of gas released by the reservoir 15.

The anesthetic gas mixture is conducted into the chamber 6 from the respiratory apparatus 1 via a check valve 28 and via the connecting line 26 (inspiration). Thereafter, the anesthetic gas mixture is directed back to the respiratory apparatus 1 via a further check valve 28 and a feedback line 25 (expiration). The quantity of the anesthetic gas mixture (air, $N_2O$, $O_2$) is adjusted with the gas supply 3.

The main circuit line 8 is connected to the chamber 6 as is the breathing circuit (2, 5, 25) via the connecting line 26. The flow through the main circuit line 8 flushes the chamber 6 with the circulating anesthetic gas mixture with the aid of the continuously or intermittently driven pumps (11, 12). With every inspiration stroke of the respiratory apparatus 1, the anesthetic gas mixture (residual gas) located in the chamber 6 is mixed with the aid of the fan 27 with the anesthetic gas mixture freshly supplied via the connecting line 26 at the breathing circuit (2, 5, 25).

During the expiration stroke, the respiratory apparatus 1 takes a predetermined quantity of anesthetic gas mixture from the chamber 6 via the connecting line 26 and directs the same to the breathing circuit (2, 5, 25). The time-dependent course of the takeup of the anesthetic gas in the oil-filled reservoirs (9, 10) is detected by measuring the anesthetic gas concentration during expiration by means of a measuring sensor 23 in the connecting line 26. The evaluation device 24 connected to the sensor 23 measures the amount of anesthetic agent remaining in the body and the amount received by the lung.

It is understood that the foregoing description is that of the preferred embodiments of the invention and that various changes and modifications may be made thereto without departing from the spirit and scope of the invention as defined in the appended claims.

What is claimed is:

1. A method for demonstrating and simulating the exchange of gases during mandatory or assisted ventilation wherein breathing gas passes through a breathing circuit and wherein a breathing gas mixture including oxygen is prepared in a gas supply unit for metering the same into the breathing circuit, the method comprising the steps of:
    metering anesthetic agent into said breathing gas mixture;
    passing the breathing gas mixture through reservoir means filled with organic oil simulating a body which is being ventilated whereby portions of the anesthetic agent are dissolved in the oil in said reservoir means;
    measuring the quantity of anesthetic agent in said breathing gas mixture after the latter has passed through said reservoir means; and,
    regulating the quantity of anesthetic agent added to said breathing gas mixture in correspondence to the amount of said anesthetic agent dissolved in said oil.

2. The method of claim 1, wherein the quantity of admixed anesthetic agent is changed to alter the portion of the anesthetic agent taken up by and released from the oil.

3. The method of claim 2, wherein the quantity of the anesthetic agent taken up or released is determined by an anesthetic agent sensor mounted in the breathing circuit.

4. The method of claim 1, wherein said reservoir means includes a plurality of reservoirs, and wherein the charge of said reservoirs is changed, with the quantity of the anesthetic gas mixture conducted through said reservoirs being unchanged, thereby changing the portion of the anesthetic gas taken up by and released from the oil.

5. The method of claim 4, wherein the quantity of the anesthetic gas taken up or released is determined by an anesthetic agent sensor mounted in the breathing circuit.

6. The method of claim 1, wherein the added oxygen and carbon dioxide components are changed to demonstrate oxygen consumption and carbon dioxide production by drawing the anesthetic gas mixture from the main circuit and separately metering the removed components of the anesthetic gas mixture to the main circuit.

7. The method of claim 1, wherein said breathing gas mixture is passed through said reservoir means filled with organic oil by using pumping means.

8. An apparatus for demonstrating and simulating the exchange of gases during ventilation, the apparatus comprising:
    a breathing circuit;
    a gas supply unit for preparing a breathing gas mixture for metering the same into said breathing circuit, the gas supply unit including: a gas blender and supply unit for preparing the anesthetic gas mixture; and, pneumatic drive means for metering said anesthetic gas mixture to said breathing circuit; and,
    a main circuit including: reservoir means for containing a charge of organic oil; and, pumping means for directing said anesthetic gas mixture through said organic oil.

9. The apparatus of claim 8, said reservoir means comprising multiple reservoirs connected in parallel with each other.

10. The apparatus of claim 9, said pumping means comprising a plurality of pumps corresponding to respective ones of said reservoirs; and, said reservoirs containing respectively different quantities of said organic oil.

11. The apparatus of claim 8, comprising: a lung-simulating unit operatively connected to said gas supply unit and connected to said breathing circuit, said lung-simulating unit including a liquid-filled U-shaped tube to model the lung parameters of compliance (C) and resistance (R), the latter having a chamber sealed with respect to the ambient.

12. The apparatus of claim 11, comprising a fan mounted in said lung-simulating unit for uniformly mixing the breathing gas components.

13. The apparatus of claim 8, said gas supply unit including a supply line communicating with said chamber.

14. The apparatus of claim 8, comprising a pumping device communicating with the ambient to draw off part of the anesthetic gas mixture out of the main circuit; and, a metering device branching off from said main circuit and connected to said pumping device whereby a quantity of the anesthetic gas mixture is drawn off from said main circuit; and, a plurality of metering units connected to said main circuit for metering corresponding ones of the components of said anesthetic gas mixture into said main circuit.

* * * * *